(12) United States Patent
Bielawski et al.

(10) Patent No.: US 6,273,940 B1
(45) Date of Patent: Aug. 14, 2001

(54) MIST ELIMINATION/AIR TOXIC CONTROL IN A WET SCRUBBER USING A CONDENSING HEAT EXCHANGER

(75) Inventors: Gregory T. Bielawski, Wadsworth; Pervaje A. Bhat, North Canton; Dennis W. Johnson, Barberton; Robert B. Myers, Norton, all of OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 1062 days.

(21) Appl. No.: 08/566,192

(22) Filed: Dec. 1, 1995

Related U.S. Application Data

(63) Continuation of application No. 08/304,742, filed on Sep. 12, 1994, now abandoned.

(51) Int. Cl.$^7$ .................................................. B01D 53/14
(52) U.S. Cl. .................................................. 95/228; 95/235
(58) Field of Search ........................ 55/220, 222, 223, 55/233, 257.1, 257.7; 95/187, 205, 228, 235

(56) References Cited

U.S. PATENT DOCUMENTS

| | | | | |
|---|---|---|---|---|
| 1,861,158 | * | 5/1932 | Hilger | 55/222 X |
| 1,927,869 | * | 9/1933 | Downs | 55/222 |
| 3,473,298 | * | 10/1969 | Berman | 55/257.7 X |
| 3,522,000 | * | 7/1970 | Kinney | 55/222 X |
| 3,854,909 | * | 12/1974 | Hoisington et al. | 55/257.7 X |
| 3,960,992 | * | 6/1976 | Cyrenne | 55/222 X |
| 4,141,702 | * | 2/1979 | deVries | 55/257.7 X |
| 4,194,889 | * | 3/1980 | Wanner | 55/257.7 X |
| 4,263,021 | * | 4/1981 | Downs et al. | 55/73 |
| 4,284,609 | * | 8/1981 | deVries | 55/257.7 X |
| 4,372,759 | * | 2/1983 | Sederquist et al. | 55/257.1 X |
| 4,487,139 | * | 12/1984 | Warner | 165/104.31 |
| 4,557,202 | * | 12/1985 | Warner | 110/216 |
| 4,705,101 | * | 11/1987 | Warner | 110/345 |
| 4,784,835 | * | 11/1988 | Fritz | 55/257.7 X |

(List continued on next page.)

FOREIGN PATENT DOCUMENTS

| | | | | |
|---|---|---|---|---|
| 0336828 | * | 5/1921 | (DE) | 55/222 |
| 2684022 | * | 5/1993 | (FR) | 55/222 |
| 0656645 | * | 4/1979 | (SU) | 55/222 |

OTHER PUBLICATIONS

J. Sun et al., "A Method to Increase Control Efficiencies of wet Scrubbers for Submicron Paricles and Particulate Metals", Air & Waste, Feb. 1994, vol. 44, pp. 184–185.*

"Utility Seeks to Integrate Heat Recovery, Flue Gas Treatment", Power, May 1994.*

J. G. Noblett, Jr. et al, "Control of Air Toxics from Coal Fixed Power Plants Using FGD Technology", EPRI Symposium on $SO_2$ Control, 1993, Boston.*

(List continued on next page.)

Primary Examiner—Robert H. Spitzer
(74) Attorney, Agent, or Firm—Robert J. Edwards; Daniel S. Kalka; Eric Marich

(57) ABSTRACT

A system for eliminating mist from a flue gas while providing air toxic control includes a wet scrubber housing having an inlet at one of the housing for the entry of the flue gas and an outlet at an opposite end of the housing for the exit of the flue gas. Sprayers are located in the housing for spraying the flue gas with a cleaning liquid in order to remove contaminants from the flue gas. At least one heat exchanger is located in the housing above the sprayers in order to remove entrained contaminants from the flue gas by cooling the flue gas. The flue gas is channeled from the inlet past the collection trays, sprayers and heat exchanger prior to exiting the housing through the outlet. A mist eliminator is also provided for eliminating mist from the flue gas.

3 Claims, 6 Drawing Sheets

U.S. PATENT DOCUMENTS

| | | | | |
|---|---|---|---|---|
| 5,004,486 | * | 4/1991 | Chen | 55/222 |
| 5,080,696 | * | 1/1992 | Marchand et al. | 55/222 X |
| 5,176,723 | * | 1/1993 | Liu et al. | 55/90 |
| 5,198,201 | * | 3/1993 | Johnson | 95/235 X |
| 5,246,471 | * | 9/1993 | Bhat et al. | 55/223 |
| 5,277,707 | * | 1/1994 | Munk et al. | 95/228 X |

OTHER PUBLICATIONS

"Flux–Force/Condensation Scrubbing System Controls Emissions from Medical Waste Incineration", The Air Polution Consultant, Nov./Dec. 1993.*

The McIlvaine Scrubber Manual, vol. IV, Chapter 2.4, Mist Eliminators, pp. 124.481–124.495.*

Scrubber Generated Particulate Literature Survey—EPRI Report CS–1739, Mar. 1981.*

S. Calvert et al., Entrainment Separators for Scrubbers—EPA Report 650/2–74–119a, Oct. 1974.*

P. A. Bhat et al., "Results of Particulate and Gaseous Sampling from a Wet Scrubber Pilot Plant", Presented EPRI Sym. 4/5–8.*

Babcock & Wilcox White Paper on Condensing Heat Exchangers.*

* cited by examiner

TEFLON-COVERED HEAT EXCHANGER MODULES

MIST ELIMINATION/AIR TOXIC CONTROL IN A WET SCRUBBER USING A CONDENSING HEAT EXCHANGER

This is a continuation of application Ser. No. 08/304,742 filed Sep. 12, 1994, now abandonded.

BACKGROUND OF THE INVENTION

1. Field of the Invention

The present invention relates, in general, to the decontamination of flue gas and, in particular, to a new and useful method to recover (fly ash), sulfur oxides and/or other contaminants contained in flue gases formed during the combustion of waste materials, coal, oil and other fossil fuels, which are burned by electric power generating plants, process steam production plants, waste-to-energy plants and other industrial processes.

2. Description of the Related Art

There are several systems relating to integrated heat recovery and the removal of particulates, sulfur oxides/acid gases and contaminants from a hot combustion exhaust gas in order to comply with federal and state requirements.

One system, which is shown in FIG. 1, is a condensing heat exchanger, generally designated 10, which recovers both sensible and latent heat from flue gas 11 in a single unit. The arrangement allows for the gas 11 to pass down through heat exchanger 12 while water 14 passes upward in a serpentine path through tubes 13. Condensation occurs within the heat exchanger 12 as the gas temperature at the tube surface is brought below the dew point. The condensate falls as a constant rain over the tube array and is removed at the bottom at outlet 16. Gas cleaning can occur within the heat exchanger 12 by the mechanisms of absorption, condensation and impaction as the gas 11 is cooled below the dew point.

The heat exchanger tubes 13 (FIGS. 2b and 2c) and inside surfaces of heat exchanger shell 15 are made of corrosion resistant material or are covered with a fluoroplastic such as fluorinated ethylene propylene (FEP), tetrafluoroethylene (TFE) or polytetrafluoroethylene (PTFE) like Teflon 17, a registered trademark of Du Pont Corp., to protect them from corrosion when the flue gas temperature is brought below the acid dew point. Interconnections between the heat exchanger tubes 13 are made outside the tube sheet 15 through holes 19 which are sealed by Teflon seal 18 and are not exposed to the corrosive flue gas stream 11. The modular design of this heat exchanger is shown in FIG. 2a.

Another system used in this area is an integrated flue gas treatment (IFGT) condensing heat exchanger, generally designated 20, which is schematically shown in FIG. 3. Condensing heat exchanger unit 20 is designed to enhance the removal of pollutants, particulate, sulfur oxides/acid gases and other contaminants from flue gas stream 22. It is also made of corrosion resistant material or has all of the inside surfaces covered by Teflon, or like material.

There are four major sections of the IFGT 20: a first heat exchanger stage 24, an interstage transition region 26, a second heat exchanger stage 28, and a mist eliminator 30. The major differences between the integrated flue gas treatment design of FIG. 2 and the conventional condensing heat exchanger design of FIG. 1 are:

1. the integrated flue gas treatment design uses two heat exchanger stages 24 and 28 instead of one heat exchanger 12 (FIG. 1);
2. the interstage or transition region 26, located between heat exchanger stages 24 and 28, is used to direct the gas 22 to the second heat exchanger stage 28, and acts as a collection tank and allows for treatment of the gas 22 between the stages 24 and 28;
3. the gas flow in the second heat exchanger stage 28 is upward, rather than downward;
4. gas outlet 29 of the second heat exchanger stage is equipped with an alkali reagent spray system, generally designated 40, comprising reagent source 42 with a pump 44 for pumping reagent 42 to sprayers 46; and
5. the mist eliminator 30 is used to separate the water formed by condensation and sprays from the flue gas.

Most of the sensible heat is removed from the gas 22 in the first heat exchanger stage 24 of the IFGT 20. The transition region 26 can be equipped with a water or alkali spray system 48. The system 20 saturates the flue gas 22 with moisture before it enters the second heat exchanger stage 28 and also assists in removing particulate, sulfur pollutants, acid gases and other contaminants from the gas 22.

The transition piece 26 is made of corrosion resistant material like fiberglass-reinforced plastic. Additionally, the second heat exchanger stage 28 is operated in the condensing mode, removing latent heat from the gas 22 along with pollutants. Also, the top of the second heat exchanger stage 28 is equipped with an alkali solution spray device 46. The gas 22 in this stage 28 is flowing upward while the droplets in the gas 22 fall downward. This counter-current gas/droplet flow provides a scrubbing mechanism that enhances particulate and pollutant capture. The captured particulate, sulfur oxides/acid gases and contaminants that are contained in the falling condensate/reacted alkali droplets flow downward and are collected at the bottom of the transition section 26. The flue gas outlet 29 of the IFGT 20 is equipped with the mist eliminator 30 to reduce the chance of moisture carryover.

Other treatment methods include wet chemical absorption processes, i.e. the use of wet scrubbers such as the unit 50 shown in FIG. 4, and in particular those applications where the hot gas 22 is typically washed in an upflow gas-liquid contact device 52 (i.e. spray tower) with an aqueous alkaline solution or slurry by sprayers 54 in order to remove sulfur oxides and/or other contaminants from the gas 22.

Wet chemical absorption systems installed by electric power generating plants typically utilize calcium, magnesium or sodium based process chemistries, with or without the use of additives, for flue gas desulfurization.

In addition, one known wet scrubbing system is described in U.S. Pat. No. 4,263,021 utilizes a gas-liquid contact system for obtaining counter-current gas-liquid contact between a flue gas containing sulfur dioxide and an aqueous slurry solution. This system is currently referred to as a tray or gas distribution device.

Other wet scrubber devices utilize various types of packing inside the spray tower to improve gas-liquid distribution which works well with clear solution chemistry processes, but are prone to gas channeling and pluggage in slurry services.

Most of the wet scrubbers use mist eliminators, normally 2–3 stages, such as mist eliminators 56, 58 as shown in FIG. 4, in order to remove entrained water droplets from the scrubbed gas.

SUMMARY OF THE INVENTION

The present invention is a system for eliminating mist from a flue gas while providing air toxic control in a wet scrubber reactor. The system comprises a wet scrubber housing having an inlet at one end of the housing for the entry of the flue gas and an outlet at an opposite end of the housing for the exit of the flue gas. Sprayers are located in the housing for spraying the flue gas with a cleaning liquid in order to remove contaminants from the flue gas. At least one heat exchanger is located in the housing above the sprayers in order to remove entrained contaminants from the flue gas by cooling the flue gas. The flue gas is channeled from the inlet past the sprayers and heat exchanger prior to exiting the housing through the outlet. A mist eliminator is also provided for eliminating mist from the flue gas.

The present invention also comprises a method for carrying out the flue gas treatment described above.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings;

FIG. 5b is a schematic view illustrating a second embodiment of the device of FIG. 5a.

DESCRIPTION OF THE PREFERRED EMBODIMENTS

Figure 1:
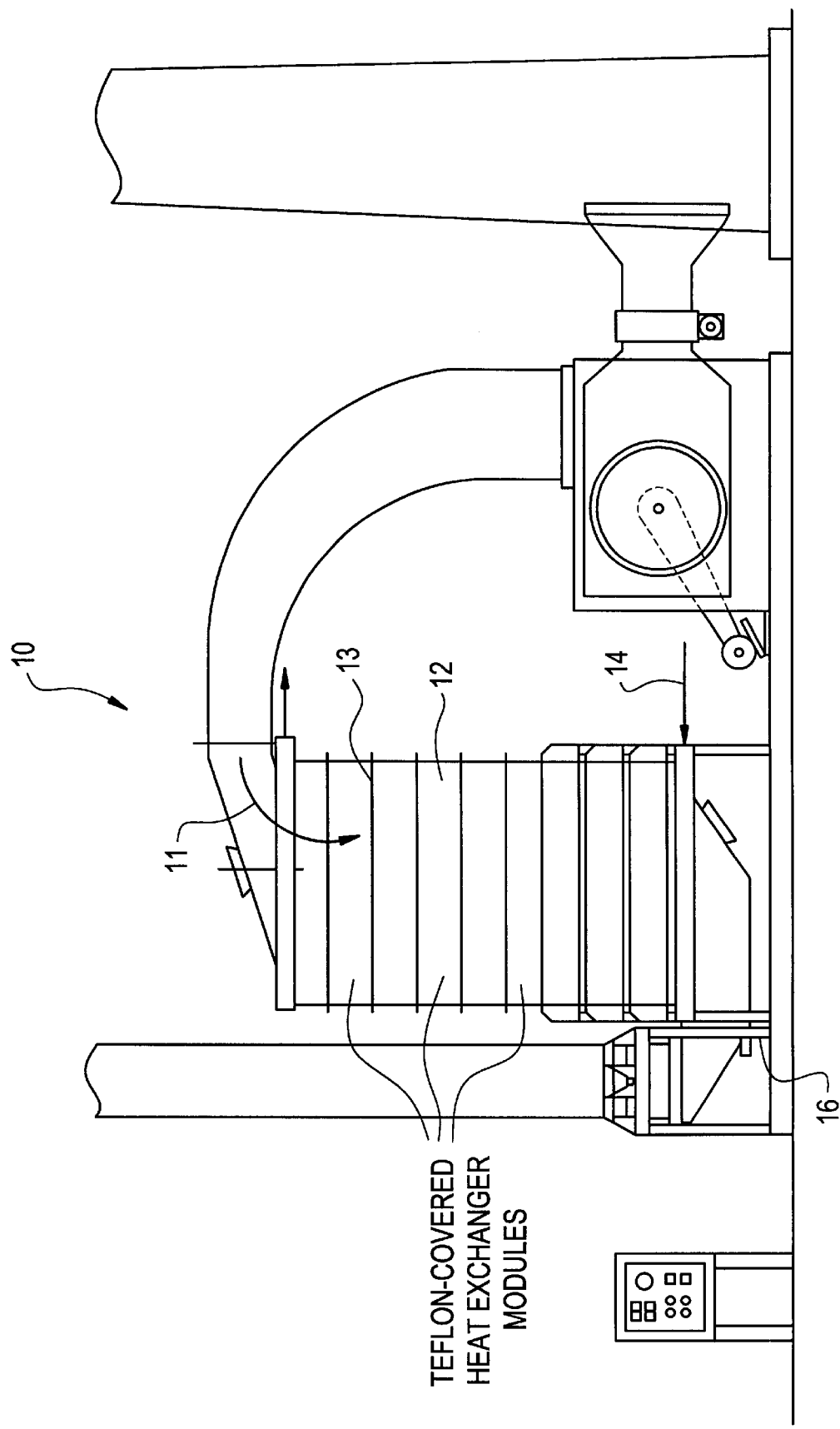
FIG. 1 is a schematic view illustrating a known condensing heat exchanger system.
Figure 2A:
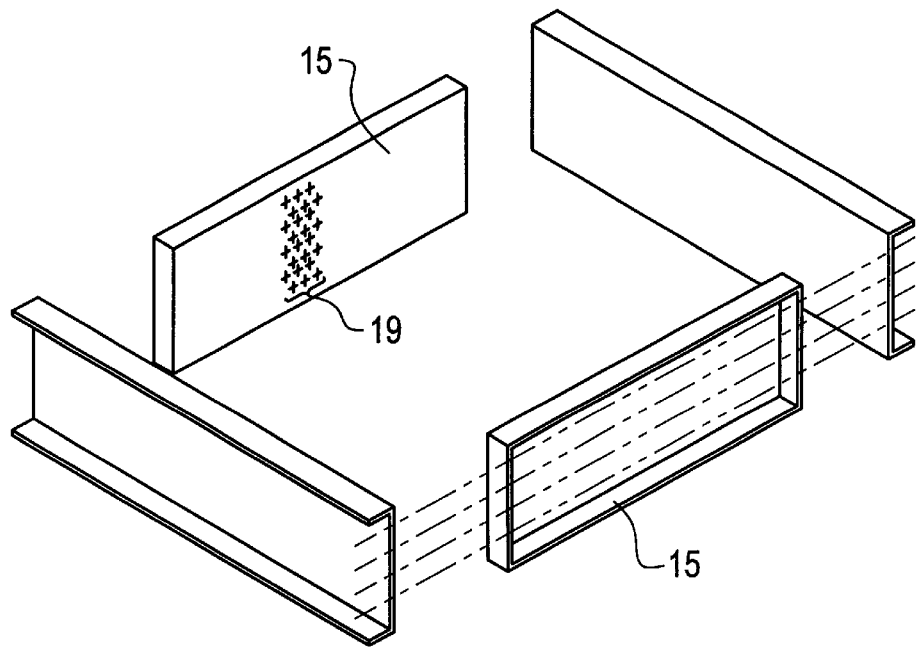
FIGS. 2a, 2b and 2c are views illustrating the arrangement and protection of heat exchanger tubes.
Figure 2B:
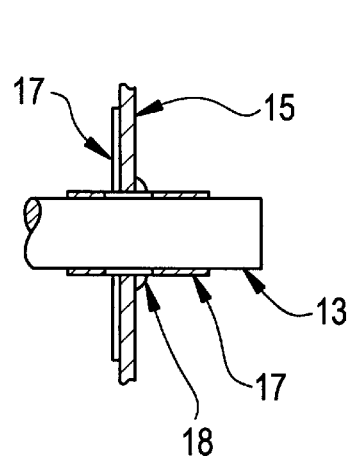
Figure 2C:
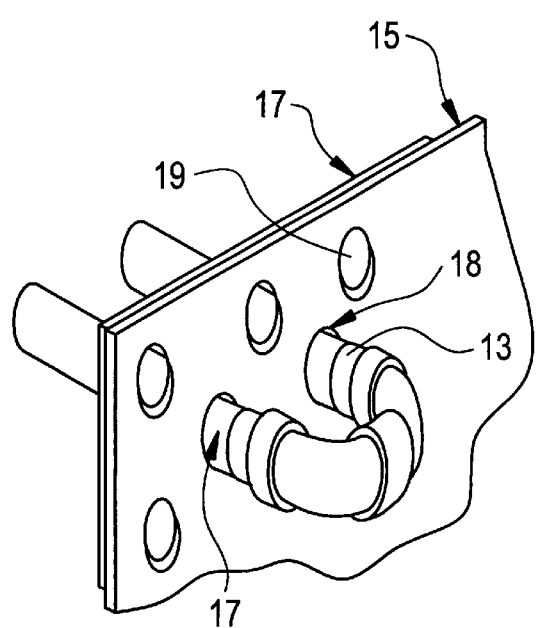
Figure 3:
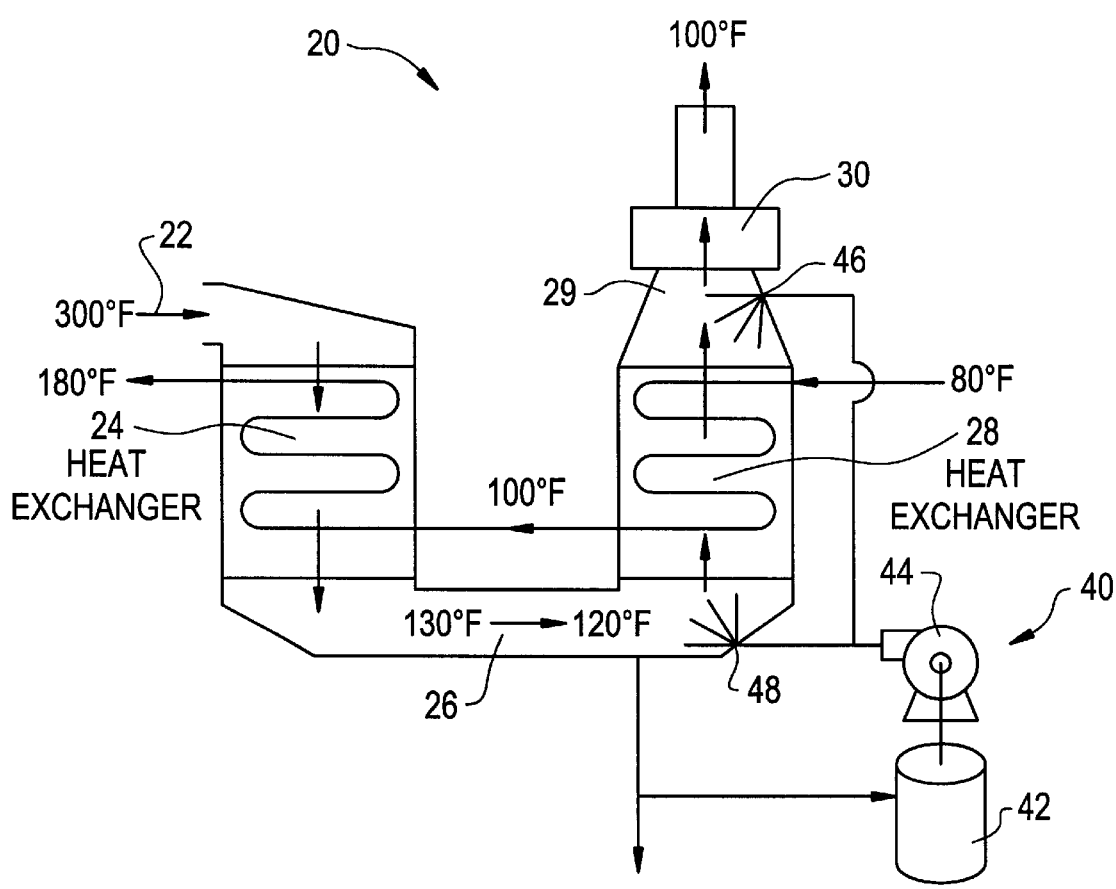
FIG. 3 is a schematic view illustrating another integrated flue gas treatment system using two heat exchangers.
Figure 4:
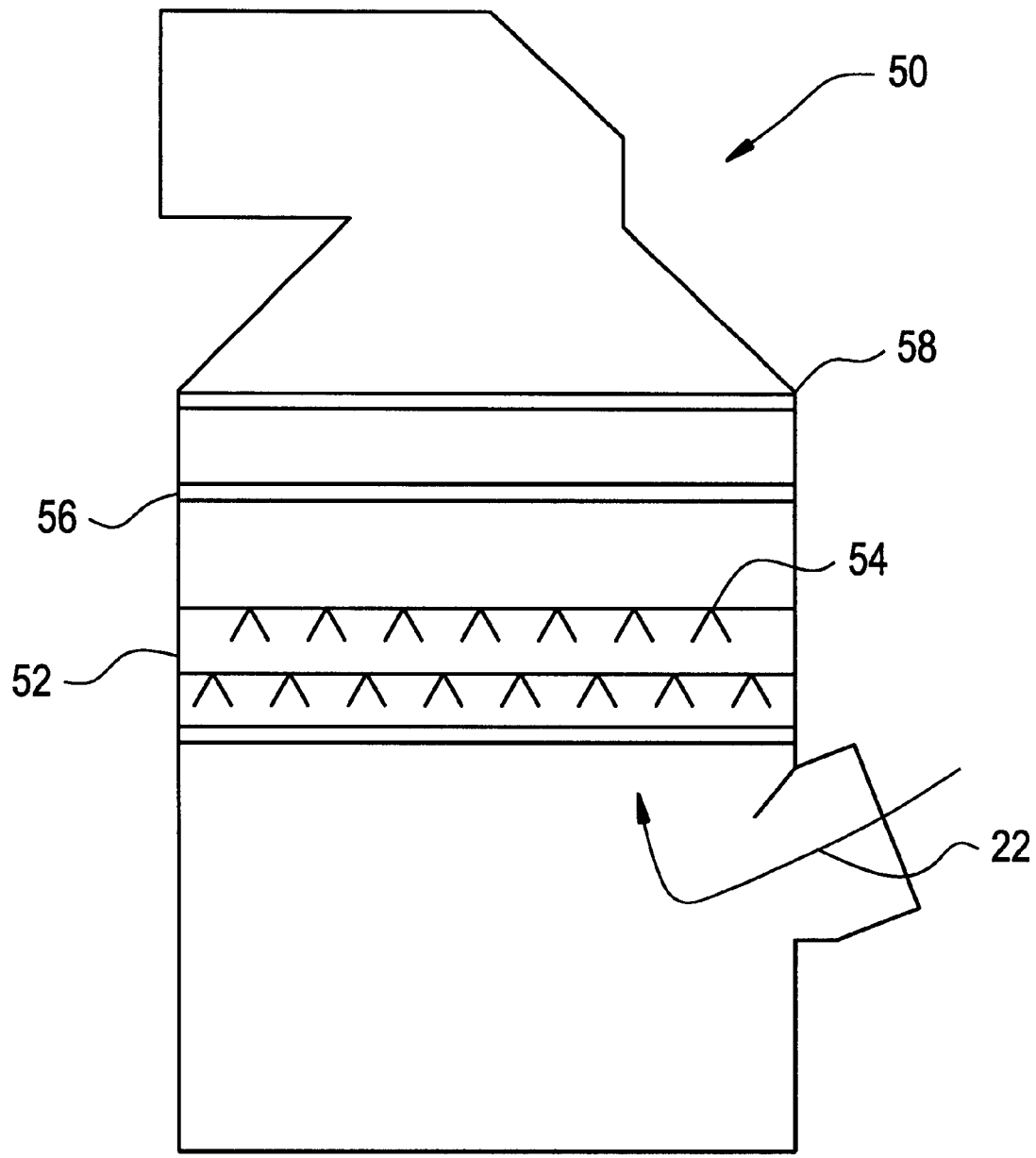
FIG. 4 is a schematic view illustrating a known wet scrubber reactor.
Figure 5A:
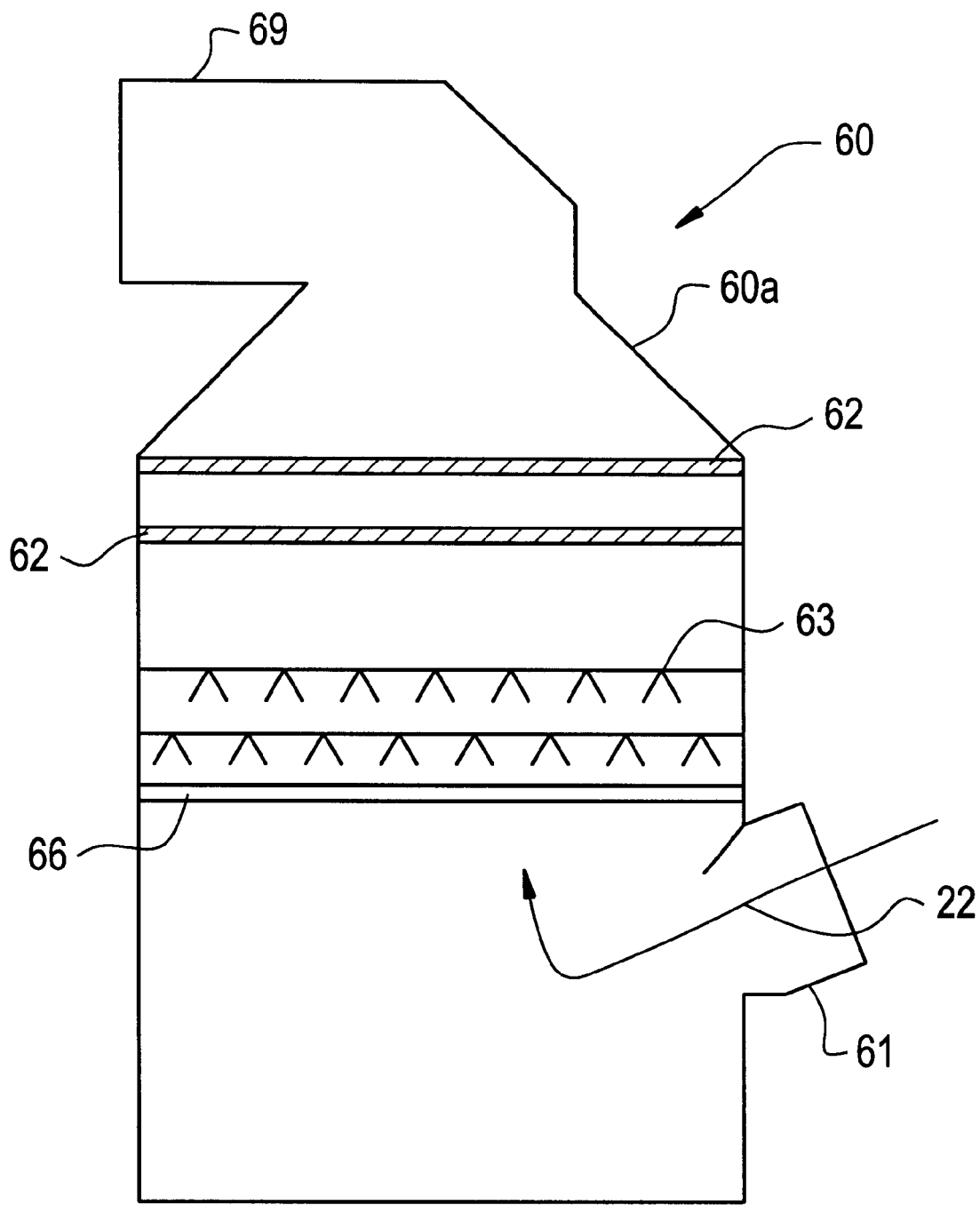
FIG. 5a is a schematic view illustrating a flue gas treatment system according to the present invention.
Figure 5B:
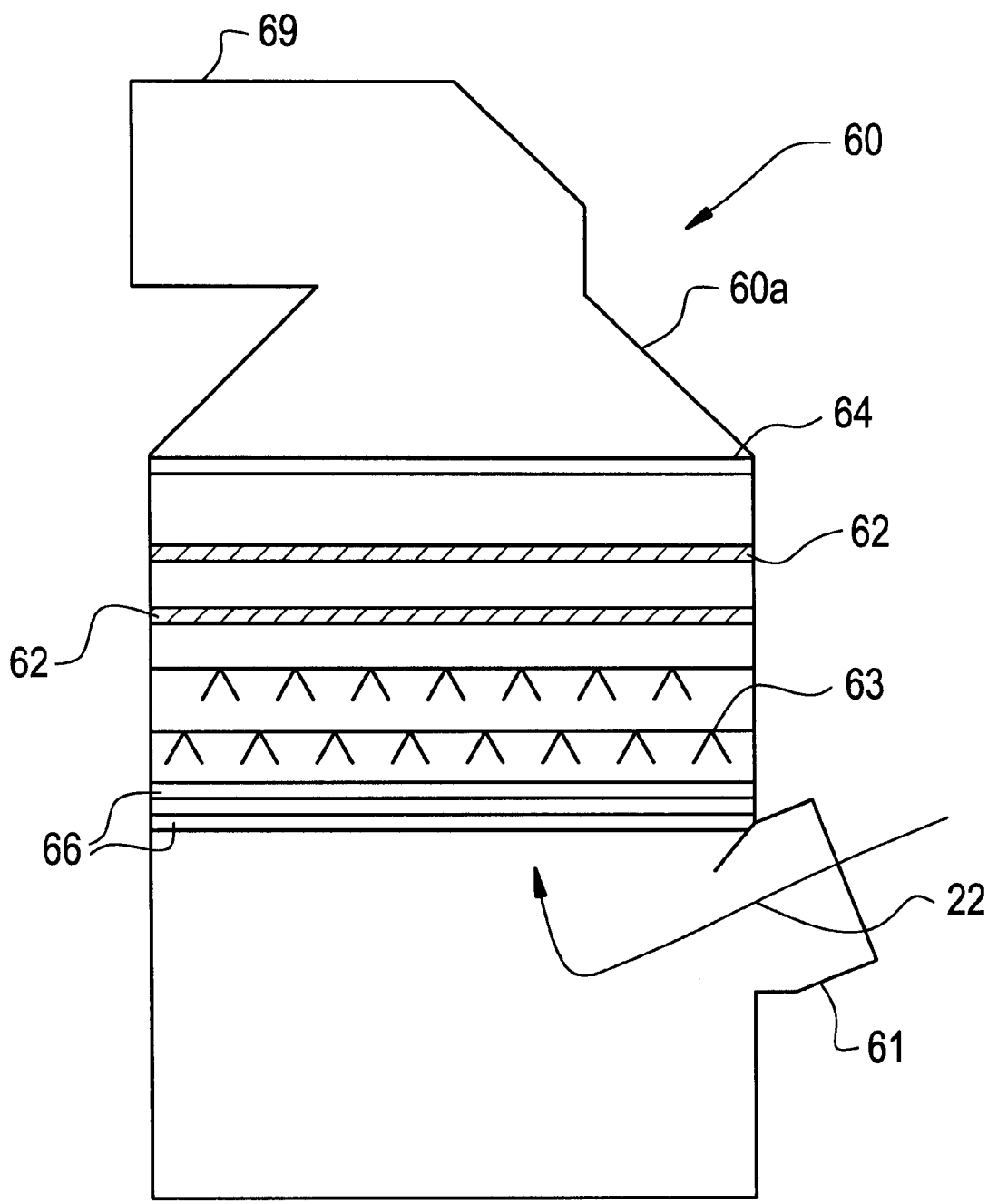

The present invention as shown in FIGS. 5a and 5b is a mist eliminator/air toxic control system, generally designated 60, for a wet scrubber 60a using at least one condensing heat exchanger 62 for providing an improved method to further enhance the removal of entrained aerosol mists/droplets and other contaminants including air toxics from a flue gas stream 22 produced by the combustion of waste materials, coal, oil and other fossil fuels which are burned by power generating plants, process steam production plants, waste-to-energy plants and other industrial processes.

The preferred embodiment of the present invention comprises of one or more tubular condensing heat exchanger stages 62 which are installed downstream (with respect to gas flow) of absorption zone sprayers 63 of the wet scrubber 60a. A final stage mist eliminator device 64 may also be installed downstream of the last condensing heat exchanger stage 62 as shown in FIG. 5b. In addition, one or more stages of perforated plates (trays) 66 or other such gas liquid contact device may be provided upon which the liquid is sprayed by sprayers 63 to promote gas-liquid contact.

Flue gas 22 containing particulates (fly ash), sulfur oxides/acid gases, and other contaminants including air toxics in vaporous, liquid and solid forms, enters the wet scrubber 60a at inlet 61 and is in counter-current contact with liquid which is introduced near the top by sprayers 63 and discharged from the bottom of the wet scrubber 60a. The sudden quenching of the flue gas 22 as it first comes in contact with the liquid sprayers 63 results in the condensation of vaporous air toxics. As certain vaporous air toxics (such as sulfur trioxide) condense, they form aerosol mists/fine droplets that are entrained in the gas stream 22 as it passes through the spray zones 63. After exiting the spray zones 63, the flue gas 22 and entrained droplets pass through tubular condensing heat exchangers 62 with their tubes arranged in an array across the gas stream.

Further condensation of water vapor and air toxics occurs within the heat exchanger 62 as the gas temperature at the tube surface is brought below the dew point. As the condensate falls as a constant rain over the tube array, additional gas cleaning occurs, further enhancing the collection of air toxics, entrained aerosol mists/droplets, particulates, and residual sulfur oxides/acid gases through the mechanisms of absorption, condensation diffusion, impaction, and interception.

The gas 22 is then demistified by mist eliminator 64 (FIG. 5b) for removing the entrained aerosol mist/fine droplets, and then exists the scrubber 60a at outlet 69 as a clean gas.

The air toxic components referred to above are mainly volatile organic compounds (VOC), HCl, $SO_3$, HF, heavy metals including but not limited to oxides, chlorides and/or sulfates of Al, As, Ca, Cd, Cr, Cu, Mg, Na, Pb, Fe, K, Zn, Be, Hg, Se and organic compounds including but not limited to hydrocarbons (Chlorinated dibenzo and dioxin, chlorinated dibenzo furans, polycyclic aromatic hydrocarbons, and PCB). Most of these air toxics and organic compounds are generated from fossil fuel and/or waste material fired combustion processes.

The present invention has several advantages over the known flue gas decontamination devices which are summarized below as follows:

1. The removal of air toxics in the form of a condensed mist (i.e. aerosol) from a combustion exhaust gas by a spray tower is enhanced through the use of one or more stages of tubular condensing heat exchangers.
2. The removal of air toxics in solid form from a combustion exhaust gas by a spray tower is enhanced through the use of one or more stages of tubular condensing heat exchangers.
3. The removal of air toxics in gaseous form from a combustion exhaust gas by a spray tower is enhanced through the use of one or more stages of tubular condensing heat exchangers.
4. There is higher trace metal removal potential due to higher particulate removal efficiency. Removal efficiencies of trace metals including mercury in the form of particulates or gases may be achieved in the range of approximately 40–90% or higher. This removal is accomplished by condensation, diffusion, impaction and momentum forces.
5. Water soluble and condensible VOC compounds can be removed at high efficiencies (in excess of 80%).
6. Higher removal efficiencies of oxidized mercury, in the range of at least 80–90%, is possible. The mercury is captured in solid form.
7. The condensing heat exchanger removes aerosols, condensible gases, fine particulates and water droplets functioning as both a condensing zone and a mist eliminator.
8. The heat recovered by the air or water within the condensing heat exchanger module may be returned into the process to increase plant efficiency.

9. The modular design allows optimization of the unit based on flue gas conditions and the temperature of the heat sink (air, water or other fluid) to control the amount of condensation and/or the exit temperature of the flue gas leaving the condensing heat exchanger. It also allows for optimization of mist elimination.

10. The use of Teflon or other fluoroplastic polymers for elements of the present invention provides an ideal surface that is hydrophobic, easy to clean and most materials in the flue gas will not adhere to it.

While specific embodiments of the invention have been shown and described in detail to illustrate the application of the principles of the invention, it will be understood that the invention may be embodied otherwise without departing from such principles.

We claim:

1. A method for removing contaminants from a flue gas, comprising the steps of:

channeling a flue gas upwardly into a vertically arranged wet scrubber housing having an inlet at a bottom end of a main portion with an outlet at the other top end;

spraying the flue gas in a counter-current contact with sprayers positioned in the main portion of the housing with a cleaning liquid for removing some of the contaminants from the flue gas;

providing at least one gas-liquid contact means in the main portion of the housing beneath the sprayers to promote gas-liquid contact;

collecting droplets from the sprayed flue gas;

passing the flue gas upwardly through an array of tubular condensing heat exchangers positioned in the main portion of the housing above the sprayers for removing remaining entrained contaminants from the flue gas by cooling the flue gas; and channeling the flue gas out of the housing through the outlet.

2. The method according to claim 1, further comprising the step of removing mist from the flue gas in the housing prior to channeling the flue gas through the outlet.

3. A method according to claim 1, wherein the passing step comprises the step of passing the flue gas upwardly through the array of tubular condensing heat exchangers positioned in a plurality of stages in the main portion of the housing above the sprayers.

* * * * *